Patented June 17, 1952

2,601,007

UNITED STATES PATENT OFFICE 2,601,007

METHOD OF MAKING SHOES USING POLYMERIZABLE PLASTIC LAYERS

Thomas Spencer, Rossendale, and Albert Edward Salmon, Marple, England; said Salmon assignor to said Spencer Application November 14, 1947, Serial No. 785,950
In Great Britain March 24, 1945

Section 1, Public Law 690, August 8, 1946
Patent expires March 24, 1965

3 Claims. (Cl. 12—142)

The present invention relates to a process of manufacturing a shoe, and more particularly to a process of manufacturing a shoe having a sole with an upper secured thereto.

It is an object of the present invention to provide a process of great simplicity.

It is another object of the present invention to provide a process which renders it possible to impregnate the sole and attach the upper to the sole in one single step.

The present invention consists in its broadest aspect in a process comprising the steps of placing a shoe sole covered mainly on its bottom face with a polymerizable plastic underneath a shoe upper with the bottom edge portions of the upper superimposed upon the sole with a polymerizable plastic arranged between the sole and the bottom edge portions of the upper, and heating the thus assembled sole and upper to a temperature sufficient to polymerize the plastic so as to simultaneously adherently coat the bottom face of the sole with a plastic and attach the upper to the sole.

A preferred embodiment of the present invention comprises the steps of placing a layer of fibrous material on top of a layer of a plastic material in an at least partly unpolymerized state, spreading a thin layer of unpolymerized plastic material around the outer edge of the upper surface of the first mentioned layer, superimposing the inturned edge of an upper on the marginal rim portion of the last mentioned layer, and applying simultaneously pressure and heat to the thus assembled sole and upper so that the plastic materials are polymerized and the marginal rim portion is caused to adhere to the inturned edge of the upper and to the upper surface of the layer consisting of fibrous material.

The invention is illustrated in the accompanying drawing in which.

Figure 1:
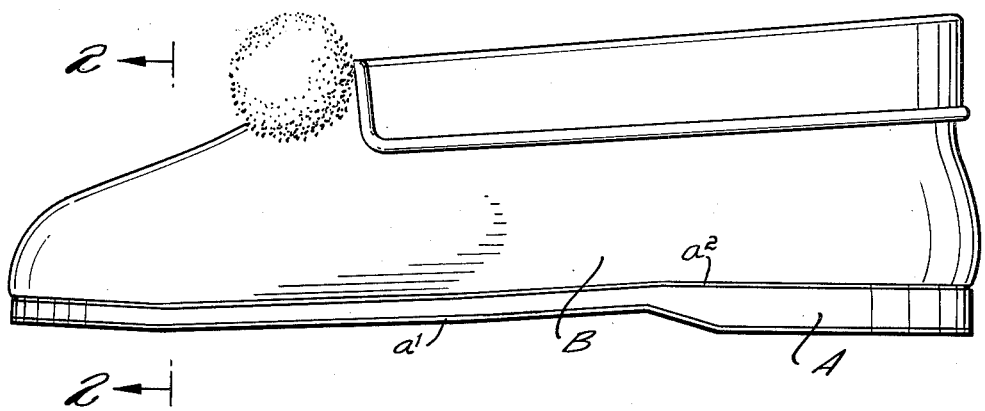
Fig. 1 is a side elevation of a shoe formed in accordance with the invention.
Figure 2:
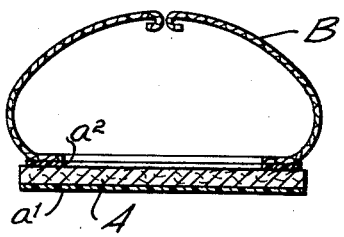
Fig. 2 is a section along the line 2—2 of Fig. 1.

Plastics suitable for the inventions include in the thermo-setting groups, synthetic resins such as the phenol-, cresol-, urea-, and thiourea-formaldehyde, and in thermoplastic groups synthetic resins, such as cellulose acetate, polyvinyl acetate and chloride and the interpolymers of the two latter. It is however, to be understood that the invention is not limited to these specified plastics. The plastic or plastics employed may be in paste, dispersion emulsion, solution or other liquid or semi-liquid form or it or they may be used in the form of sheets, films, powder or granules.

In carrying out the invention when the base or base material forming the sole A is in the form of a sheet, such as felt, textile fabric or the like, it is impregnated with a solution, dispersion, emulsion or other liquid or paste form of the plastic selected to give the desired degree of resiliency, the sole being either cut out from a preimpregnated sheet or sheets of the base or cut out from the base and then impregnated. If a sole of a more or less rigid type is desired a thermo-setting plastic such as phenol-formaldehyde is employed, whilst to obtain a flexible resilient sole a thermo-plastic material such as polyvinyl chloride is used.

When a shoe is desired having a very flexible sole the bottom surface, the edge surfaces and the top surface or a portion of the top surface adjacent to the edges may be impregnated with the plastic leaving a core of unimpregnated base material.

As before stated the upper B may be formed of any suitable material commonly employed in the manufacture of shoes, including leather or a woven fabric, such an upper being placed in a mould with the sole or the sole and heel and moulded thereto by the application of heat and/or pressure, the sole or the sole and heel being either preformed or formed during the moulding of the upper thereto as desired or as found to be practicable according to the type of plastic employed for impregnating the base material.

The upper B may also be formed from a plastic or from a base material impregnated with a plastic. In such case the base material forming the upper is treated with a liquid form of plastic which may be the same as or different from that applied to the sole, providing of course that the two are compatible. Moreover, the base for both upper and sole may be only partially impregnated, thus providing an untreated inner surface of the felt or woven fabric, serving as a sock or lining and giving a warm comfortable and absorbent surface in contact with the feet of the wearer.

The impregnated sole portion and the impregnated pieces forming the upper, after being dried if necessary to remove water or solvents are placed in position in a suitable mould and by the application of heat and pressure the shoe is moulded to shape and substantially in one piece as under the influence of the two the plastic and base are homogeneously welded together.

Where the plastics employed are of the thermo-setting type the synthetic resins are converted into the hardened, fully polymerised form and when of the thermo-plastic variety where hardening due to polymerisation does not in all cases take place but only softening sufficient for moulding occurs, the mould is cooled preferably under pressure before removing the shoe.

The sole and heel become formed as a unit with the upper by using a mould M (Fig. 3) of suitable design. The usual characteristic shape can be given to the shank or portion of the sole between the sole proper and the heel.

Figure 3:
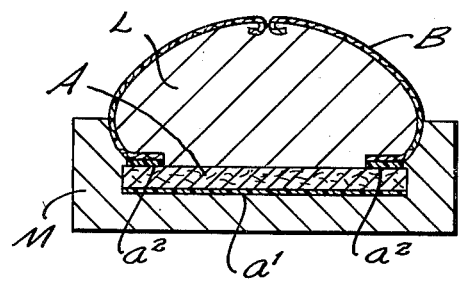
Fig. 3 is a similar section to Fig. 2, but showing the sole coated with a wearing surface and with the marginal layer, and a last and a mould used in the process according to the invention.
Figure 4:
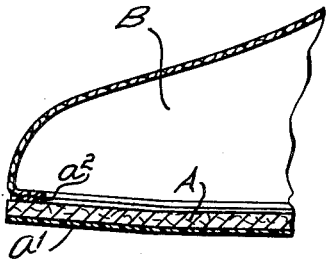
Fig. 4 is a longitudinal section of the shoe shown in Fig. 1.
Figure 4:
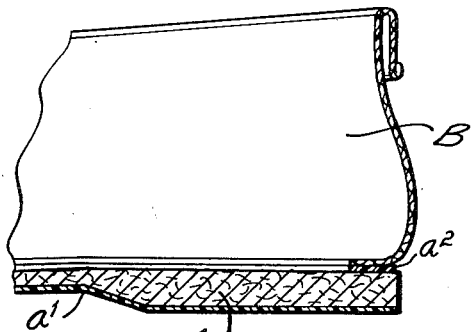

Alternatively, the upper B and the sole A may be secured together—using as an adhesive one of the cements prepared from a synthetic resin and compatible with the plastic to be subsequently used in making the shoe—the whole being then impregnated, surface coated to form a wearing surface A' as shown in Fig. 3 if desired and heated under pressure as previously described.

The object of impregnating the base fabric before moulding the upper and the sole (and heel) is firstly to combine the whole structure into a homogeneous mass and secondly, where the final surface coating is of a flexible thermo-plastic type, to give a certain amount of rigidity to the base—the subsequent coatings which may be applied in various colours either singly or in combination providing the wearing surface and ornamentation and also facilitating moulding. An improved and distinct method of ornamentation would be to use a base of which the outside is coloured or printed in design and an outer surface A' of plastic of a transparent or translucent nature. The upper may be perforated or otherwise provided with holes to provide for ventilation and/or to decrease its weight.

We claim:

1. In a process of manufacturing a shoe having a sole and an upper secured thereto, the steps of arranging a shoe sole with a polymerizable plastic applied to its bottom face underneath a shoe upper with the bottom edge portions of said shoe upper superimposed upon said shoe sole and with a polymerizable plastic arranged between said shoe sole and said bottom edge portions of said shoe upper; and heating said thus assembled shoe sole and shoe upper to a temperature sufficient to polymerize said plastic so as to polymerize said plastic and thereby simultaneously adherently coat said bottom face of said shoe sole with said plastic and attach said shoe upper to said shoe sole.

2. In a process for manufacturing a shoe having a sole and an upper secured thereto, the steps of locating in a mold a layer of fibrous material with plastic material in an at least partly unpolymerized state arranged on its bottom face; spreading a thin layer of unpolymerized plastic material around the outer edge of the upper surface of said first mentioned layer; superimposing the inturned edge of a shoe upper on the marginal rim portion of said last mentioned layer; and applying simultaneously pressure and heat to the thus assembled shoe sole and shoe upper.

3. In a process for manufacturing a shoe having a sole and an upper secured thereto, the steps of locating in a mold a layer of fibrous material with plastic material in an at least partly unpolymerized state arranged on its bottom face; spreading a thin layer of unpolymerized plastic material around the outer edge of the upper surface of said first mentioned layer; superimposing the inturned edge of a shoe upper on the marginal rim portion of said last mentioned layer; and applying simultaneously pressure and heat to the thus assembled shoe sole and shoe upper so that the plastic materials are polymerized and said marginal rim portion is caused to adhere to the inturned edge of the shoe upper and to the upper surface of the layer consisting of fibrous material.

THOMAS SPENCER.
ALBERT EDWARD SALMON.

REFERENCES CITED

The following references are of record in the file of this patent:

UNITED STATES PATENTS

| Number | Name | Date |
|---|---|---|
| Re. 22,301 | Pitman | Apr. 13, 1943 |
| 1,758,438 | Glidden | May 13, 1930 |
| 2,061,296 | Wedger | Nov. 17, 1936 |
| 2,121,678 | Armor | June 21, 1938 |
| 2,180,924 | Dunbar | Nov. 21, 1939 |
| 2,302,167 | Austin | Nov. 17, 1942 |
| 2,323,563 | Nugent | July 6, 1943 |
| 2,333,303 | Enos | Nov. 2, 1943 |
| 2,360,763 | Crandell | Oct. 17, 1944 |
| 2,403,313 | Taylor | July 2, 1946 |

FOREIGN PATENTS

| Number | Country | Date |
|---|---|---|
| 109,113 | Australia | Nov. 14, 1939 |